Patented Nov. 28, 1922.

1,437,343

UNITED STATES PATENT OFFICE.

GEORGE HOWARD, OF LAVERNE, OKLAHOMA, ASSIGNOR OF THREE-FOURTHS TO EDGAR H. GEORGE, HIATT N. ARNOLD, OTTO SCHOPP, AND C. C. ARNOLD, ALL OF BUFFALO, OKLAHOMA.

STORAGE-BATTERY SOLUTION.

No Drawing. Application filed July 24, 1922. Serial No. 577,196.

*To all whom it may concern:*

Be it known that I, GEORGE HOWARD, a citizen of the United States, residing at Laverne, in the county of Harper and State of Oklahoma, have invented new and useful Improvements in Storage-Battery Solutions, of which the following is a specification.

In carrying out the present invention it is my purpose to provide a storage battery solution whereby the life of the battery may be prolonged and the plates of the battery preserved, and which will, at the same time, increase the strength of the battery so that the latter will give maximum service and respond immediately to all demands made upon it.

It is also my purpose to provide a storage battery solution which may be manufactured and sold cheaply and which will act as a preservative to the plates or elements in the storage battery.

With the above recited objects in view, and others of a similar nature, the invention resides in the combination of ingredients set forth in and falling within the scope of the appended claims.

In the practice of my invention I employ a quantity of sulphuric acid to which is added distilled water until the specific gravity is 1.260. To this is added a sodium bicarbonate and sodium borate. Salicylic-soda dissolved in hot water is added to the foregoing ingredients and this mixture produces a storage battery solution that preserves the life of the elements of the battery, strengthens the battery and enables the battery to give maximum service under all conditions.

As an illustration of the proportions in which the ingredients are mixed, to one gallon of a mixture of sulphuric acid and distilled water with a specific gravity of 1.260, there is added one-half pound of sodium bicarbonate, one ounce of sodium borate and one ounce of salicylic-soda dissolved in four ounces of hot water. The sulphuric acid with a specific gravity of 2.400 and distilled water are mixed in equal parts.

This mixture produces one gallon of the solution.

I have entered into a detailed description of the specific ingredients embraced in the present and preferred embodiment of my invention with a view to imparting a full, clear and exact understanding of the said embodiment. I do not desire, however, to be understood as confining myself to the said specific ingredients, inasmuch as in the future practice of my invention such changes or modifications may be made as fairly fall within the scope of my invention as defined by my appended claims.

Having thus described the invention, what is claimed as new, is:—

1. A storage battery solution comprising sulphuric acid, distilled water, sodium bicarbonate, sodium borate and salicylic-soda.

2. A storage battery solution comprising equal parts sulphuric acid with specific gravity of 2.400 and distilled water mixed to a specific gravity of 1.260 to the gallon, one-half pound of sodium bicarbonate, one ounce sodium borate and one ounce salicylic-soda dissolved in four ounces hot water.

In testimony whereof I affix my signature.

GEORGE HOWARD.